Aug. 8, 1967    D. DOUGLAS    3,334,574
CUP MOUNTED COFFEE CONES
Filed June 4, 1964    2 Sheets-Sheet 1

INVENTOR
DAVID DOUGLAS
BY John W. Michael
ATTORNEY

Aug. 8, 1967 D. DOUGLAS 3,334,574
CUP MOUNTED COFFEE CONES
Filed June 4, 1964 2 Sheets-Sheet 2

INVENTOR
DAVID DOUGLAS
BY John W. Michael
ATTORNEY

United States Patent Office 3,334,574
Patented Aug. 8, 1967

3,334,574
CUP MOUNTED COFFEE CONES
David Douglas, 1332 S. 26th St.,
Manitowoc, Wis. 54220
Filed June 4, 1964, Ser. No. 372,516
2 Claims. (Cl. 99—304)

This invention pertains to a novel coffee maker of the drip type.

The coffee maker embodying my invention is comprised of a cone-shaped receptacle which is provided with an outwardly flaring base by means of which the coffee maker may be positioned on the rim of a drinking or serving vessel. The cone-shaped receptacle is adapted to accommodate a single-use disposable filter paper cone which in turn is adapted to accommodate ground coffee over which hot water is poured to make coffee.

One advantage of providing an individual coffee maker for each cup is that coffee can be readily made in one or two cup servings and each serving can be prepared to the particular strength preferred by the person for whom the coffee is intended.

Another important feature of this invention resides in the use of a cone-shaped receptacle as opposed to some other shape. Such cone-shaped receptacle provides several important advantages. First, it facilitates the use of a disposable filter paper cone of simplified construction to thus minimize cost. Secondly, the perfectly symmetrical shape of the cone produces maximum turbulence and a uniform mixing of the hot water with the coffee in the cone to thus provide a more efficient extraction from the coffee.

Further, the coffee maker embodying my invention is of unitary construction (when assembled) and therefore eliminates the necessity of assembling several coffee maker components before and after making coffee as is necessary with today's drip-type coffee makers. This feature simplifies the coffee making as well as renders the coffee maker more easily cleanable than those known heretofore. In this respect it is of note that in the coffee maker embodying my invention the coffee grounds only come in contact with the filter paper cone and are not in direct contact with the cone-shaped receptacle itself. This feature renders the coffee maker more easily cleanable than those known today.

The principal object of this invention is to provide a coffee maker having the above enumerated advantages.

Other objects and advantages will be pointed out in, or be apparent from the specification and claims, as will obvious modifications of the two embodiments shown in the drawings, in which:

Figure 1:
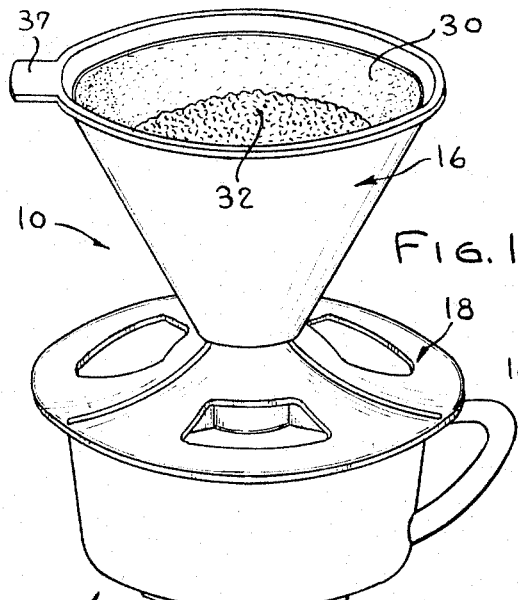
FIG. 1 is a perspective view of the coffee maker embodying my invention, the coffee maker being shown positioned on the rim of the cup.
Figure 3:
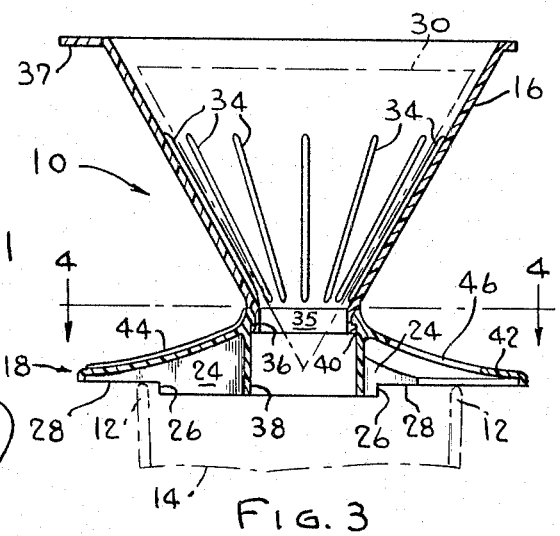
FIG. 3 is a cross-sectional view thereof taken on lines 3—3 of FIG. 2.
Figure 2:
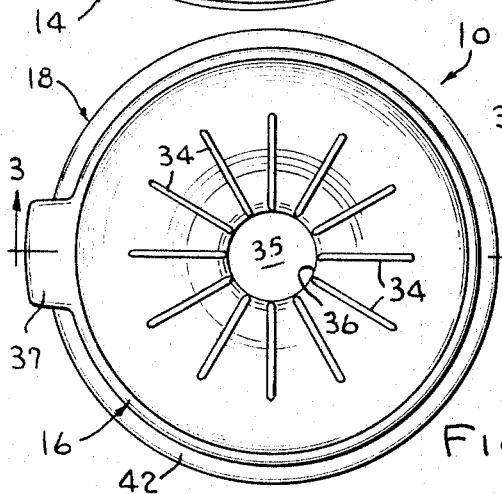
FIG. 2 is a top plan view of the coffee maker.
Figure 5:
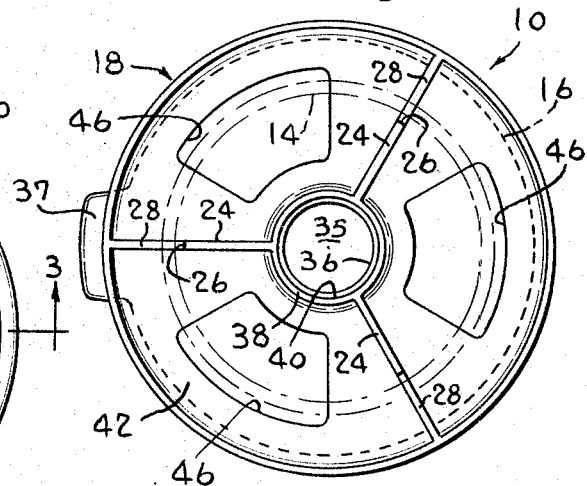
FIG. 5 is a bottom plan view of the coffee maker.
Figure 4:
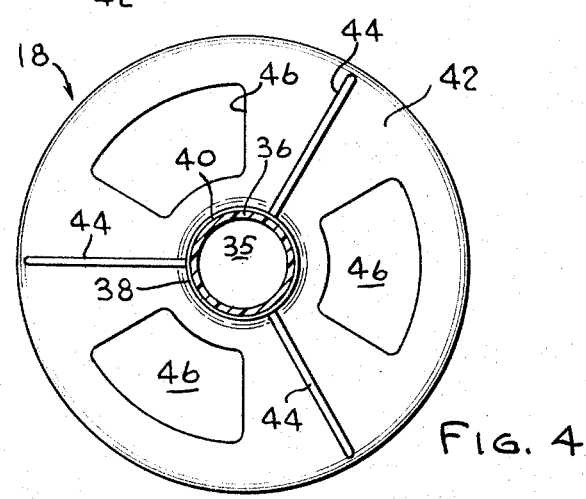
FIG. 4 is a cross-sectional view thereof taken on lines 4—4 of FIG. 3.

Referring to the drawings in detail, FIGS. 1 and 3 show the coffee maker 10 embodying the present invention positioned on the rim 12 of a cup 14.

The coffee maker is comprised of a cone-shaped receptacle 16 which is permanently secured to an outward flaring base 18 by means of interlocking tabs 20 and 22. The underside of the base is provided with three radial ribs 24, which are of a stepped contour, each having an outwardly facing step 26 and outer rib portions 28. This construction permits the coffee maker to be positioned over the top openings of drinking or serving vessels of variable sizes. The edge 12 of the cup is engaged by the rib portions 28 and the steps 26 project into the vessel and act as stop members to prevent the coffee maker from sliding off the cup.

Figure 10:
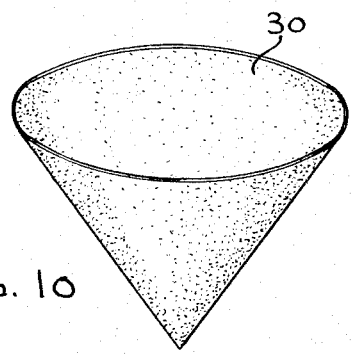
FIG. 10 is a perspective view of a disposable filter paper cone of the type used with the coffee maker of this invention.

The cone-shaped receptacle 16 is adapted to accommodate a filter paper cone 30, which may be either preformed in the cone-shape or which may be formed by folding a round piece of filter paper into a quadrant form and then opening it up to the cone-shape, as shown in FIG. 10. The filter paper 30 is positioned within the cone as shown in FIGS. 1 and 3 and is adapted to receive ground coffee 32. The inside wall of the receptacle is provided with axially extending ribs 34 which space portions of the filter paper away from the inside wall of the receptacle and thereby facilitate the flow of hot water into cup 14 after it has passed over the ground coffee retained in the paper cone. The cone is also provided with a tab 37 by means of which the coffee maker can be handled.

An important feature of this invention is the use of a cone-shaped receptacle 16 for receiving the filter paper cone 30 and the ground coffee 32 therein. By making receptacle 30 cone-shaped, a disposable filter paper cone of simplified design (FIG. 10) may be employed to thus minimize cost. Also, the symmetrical shape afforded by the cone-shaped receptacle produces maximum turbulence and a uniform mixing of the hot water with the coffee in the cone to thus provide a highly efficient extraction from the coffee.

Figure 6:
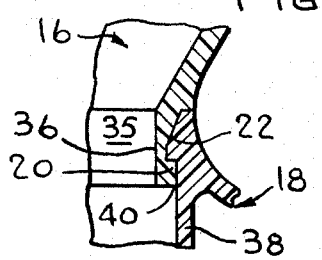
FIG. 6 is an enlarged fragmentary view in cross section of the interlocking tab connection between the cone-shaped receptacle and the base.

As best seen in FIGS. 3 and 6 the cone-shaped receptacle 16 has a central aperture 35 at its small end and is provided with a short cylindrical portion 36 extending therefrom. This portion is received in cylindrical portion 38 of the base and secured therein by the annular interlocking ridges 20 and 22 formed on the inside and outside faces of portions 36 and 38, respectively. Because of this construction any of the coffee dripping through the filter cone 30 is prevented from coming in contact with the seam 40 between the cylindrical portions and thereby prevents any accumulation of deposits therein. The cylindrical portion 38 is integral with the top member 42 of the base as well as with the ribs 24. The top member 42 is also provided with small ribs 44 on its top surface.

I prefer to make the coffee maker of molded polypropylene since I find that this material does not stain and stands up well under the temperatures encountered in this particular use. In assembly of the coffee maker the base 18 and its cylindrical portion 38 are initially made over-size and after they are properly aligned with the receptacle 16 they are shrunk into the engaging position as shown in FIGS. 3 and 6. This mode of assembly and construction renders the coffee maker of unitary construction. Also, by making the coffee maker from two pieces permanently assembled together to form the completed unit as described above, the molds and molding operations in the manufacture of the two parts is greatly simplified.

The outward member 42 of the base is further provided with apertures or windows 46 which permit the user to see the rising level of coffee in the drinking or serving vessel to avoid the pouring of excessive hot water into the cone and thus the overflowing of the vessel.

Figure 7:
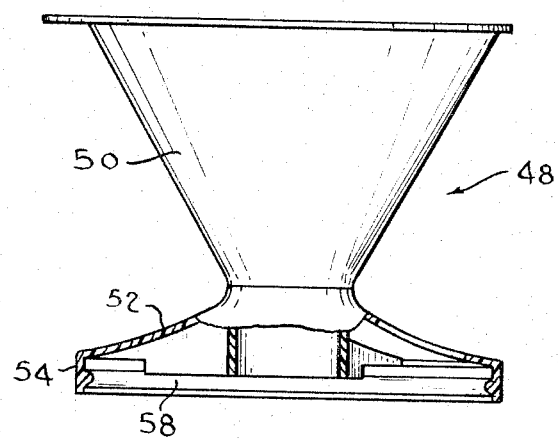
FIG. 7 is a side elevation view (with parts broken away) of a second embodiment of this invention.
Figure 8:
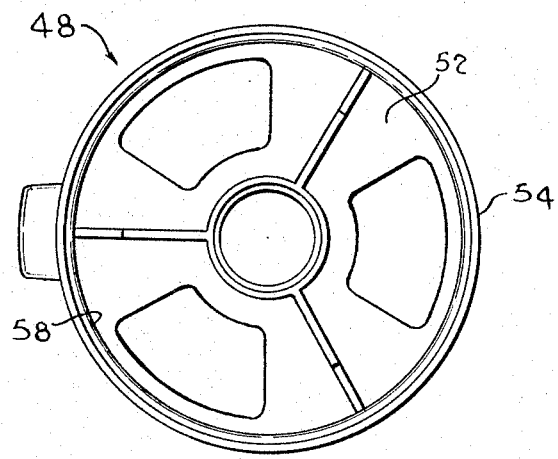
FIG. 8 is a bottom plan view of the coffee maker shown in FIG. 7.
Figure 9:
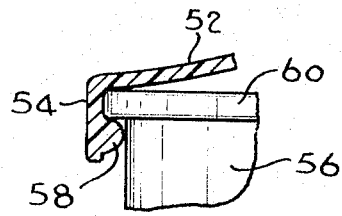
FIG. 9 is a fragmentary view showing how the coffee maker can be assembled on the top of a coffee can of conventional construction.

A second embodiment of this invention is shown in FIGS. 7–9 and is identified by reference numeral 48. This embodiment is quite similar in construction to that shown in FIGS. 1–6 and is comprised of a cone-shaped receptacle 50 secured to an outward flaring base 52. The construction of receptacle 50 is identical to receptacle 16 which has been previously described. Base 52 is similar in construction to base 18 of the first embodiment but is provided with a specially constructed depending lip 54 designed to permit removable attachment of the coffee maker 48 to the top of an unopened coffee can 56 of conventional construction (FIG. 9). The purpose of this construction is to facilitate attachment of the coffee maker 48 to an unopened can of coffee so that the coffee maker and can of coffee can be conveniently and efficiently displayed and sold as a combination product. This is accomplished by providing a depending lip 54 on base 52 as shown with lip 54 having an inwardly extending annular ridge 58 formed thereon adapted for interlocking engagement with the annular ridge 60 formed at the top of a conventional coffee can of the vacuum pack type. The diameter of base 52 will, of course, conform with the diameter of can 56 so that coffee maker 48 can be simply snapped onto the coffee can for purposes of display and sale as a unit. Once the purchaser has purchased the unit, coffee maker 48 can be readily removed and is then used in the same manner as described above with respect to coffee maker 10 shown in FIGS. 1–6.

Although two embodiments of the present invention have been illustrated and described, it will be apparent to those skilled in the art that various changes and modifications may be made therein without departing from the spirit of the invention or from the scope of the appended claims.

I claim:
1. A drip-type coffee maker adapted to be positioned over the opening of a drinking or serving vessel comprising:
   a cone-shaped receptacle adapted to retain ground coffee and having a central aperture at its small end to permit water to flow out of said receptacle after it has passed through the coffee;
   an outwardly extending base fixed to said small end, said base having a plurality of radial ribs thereon which are of a stepped contour, each of said steps having an outwardly facing step portion and an outer rib portion to permit the coffee maker to be positioned over the top opening of drinking or serving vessels of variable size, said outwardly flaring base further characterized by apertures therein adapted to permit the user to see the rising level of coffee in the vessel and thereby avoid pouring excessive water therein.
2. A drip-type coffee maker according to claim 1 in which the base of said coffee maker has a depending peripheral lip thereon with an internally extending annular ridge formed on said lip to facilitate removable attachment of the coffee maker to a coffee can of conventional construction.

References Cited
UNITED STATES PATENTS

| | | |
|---|---|---|
| 2,234,397 | 3/1941 | Bentz. |
| 2,358,556 | 9/1944 | Block. |
| 2,835,191 | 5/1958 | Clurman _____ 99—304 X |
| 3,080,810 | 3/1963 | Saint _____ 99—306 |
| 3,166,003 | 1/1965 | Merson _____ 99—306 |
| 3,215,060 | 11/1965 | Perlov _____ 99—306 |

FOREIGN PATENTS

| | | |
|---|---|---|
| 1,105,494 | 7/1955 | France. |

WILLIAM I. PRICE, *Primary Examiner.*

WALTER A. SCHEEL, *Examiner.*

S. P. FISHER, *Assistant Examiner.*